United States Patent
Vale et al.

(10) Patent No.: US 10,628,620 B2
(45) Date of Patent: Apr. 21, 2020

(54) METHOD AND SYSTEM FOR TRANSFORMING MESH FOR SIMULATING MANUFACTURING PROCESSES AND PRODUCTS

(71) Applicant: Tata Consultancy Services Limited, Mumbai (IN)

(72) Inventors: Sushant S. Vale, Pune (IN); Sreedhar S. Reddy, Pune (IN); Gautham Purushottham Basavarsu, Pune (IN); Amarendra Kumar Singh, Pune (IN); Raghavendra Reddy Yeddula, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 617 days.

(21) Appl. No.: 15/500,967

(22) PCT Filed: Aug. 3, 2015

(86) PCT No.: PCT/IB2015/055886
§ 371 (c)(1),
(2) Date: Feb. 1, 2017

(87) PCT Pub. No.: WO2016/016875
PCT Pub. Date: Feb. 4, 2016

(65) Prior Publication Data
US 2017/0220715 A1      Aug. 3, 2017

(30) Foreign Application Priority Data
Aug. 1, 2014   (IN) .......................... 2480/MUM/2014

(51) Int. Cl.
*G06F 30/20*      (2020.01)
*G06T 19/20*      (2011.01)
(Continued)

(52) U.S. Cl.
CPC ............ *G06F 30/20* (2020.01); *G06T 17/205* (2013.01); *G06T 19/20* (2013.01);
(Continued)

(58) Field of Classification Search
CPC ....................................................... G06T 19/20
See application file for complete search history.

(56) References Cited

U.S. PATENT DOCUMENTS

| 4,972,334 A | * | 11/1990 | Yamabe | .................. G06F 17/13 700/86 |
| 2002/0095276 A1 | * | 7/2002 | Rong | ...................... G06T 17/00 703/2 |

(Continued)

FOREIGN PATENT DOCUMENTS

WO      WO 2014087427 A1      6/2014

OTHER PUBLICATIONS

Siemens, "NX Advanced Simulation: FE modeling and simulation", Siemens, 8 pages, (2011) Link: http://www.mayahtt.com/wp-content/uploads/2013/03/NX%20Advanced%20Simulation%20%20Fact%20Sheet.pdf.
(Continued)

*Primary Examiner* — Cedric Johnson
(74) *Attorney, Agent, or Firm* — Finnegan, Henderson, Farabow, Garrett & Dunner LLP

(57) ABSTRACT

A method and system is provided for transforming mesh for simulating manufacturing processes and products. The present application provides a method and system for transforming mesh for simulating at least one manufacturing process and at least one product comprises of selecting one or more transformation rules; executing the selected one or more transformation rules for obtaining a transformation chain; and executing the obtained transformation chain for obtaining a transformed mesh data using a transformation engine.

15 Claims, 2 Drawing Sheets

(51) Int. Cl.
*G06T 17/20* (2006.01)
*G06F 119/18* (2020.01)

(52) U.S. Cl.
CPC .. *G06F 2119/18* (2020.01); *G06T 2219/2016* (2013.01); *G06T 2219/2021* (2013.01)

(56) References Cited

U.S. PATENT DOCUMENTS

| | | | |
|---|---|---|---|
| 2003/0206178 A1* | 11/2003 | Hoppe | G06T 17/20 345/582 |
| 2006/0290695 A1* | 12/2006 | Salomie | G06T 17/20 345/420 |
| 2008/0021679 A1* | 1/2008 | Bleiweiss | A63F 13/00 703/2 |

OTHER PUBLICATIONS

International Search Report, from the European Patent Office in corresponding PCT Application No. PCT/IB2015/055886, dated Nov. 25, 2015.

\* cited by examiner

METHOD AND SYSTEM FOR TRANSFORMING MESH FOR SIMULATING MANUFACTURING PROCESSES AND PRODUCTS

CROSS-REFERENCE TO RELATED APPLICATIONS AND PRIORITY

The present application claims priority to Indian Provisional Patent Application No. 2480/MUM/2014, filed on Aug. 1, 2014, the entirety of which is hereby incorporated by reference.

FIELD OF THE INVENTION

The present application generally relates to manufacturing processes simulation and products data processing. Particularly, the application provides a method and system for transforming mesh for simulating manufacturing processes and products.

BACKGROUND OF THE INVENTION

Any product or article of manufacture obtained through a manufacturing process, involves a raw material undergoing a plurality of stages or unit operations to provide the finished article. Example of such stages or unit operations include, forging, machining, carburization, quenching, tempering, shot peening, to name a few. Prior to implementing the manufacturing process, a numerical simulation may be conducted to accurately ascertain and determine the physical and state changes that may result due to different stages being implemented. Such simulation may provide a determination whether the choice of material or other design consideration are appropriate, or whether they further require any modification. Simulation generally involves obtaining an analytical model representing the article. This model in turn may be composed of one or more finite elements, also referred to as volume meshes. These simulations may be computationally very expensive. In order to implement these efficiently, one or more assumptions may be made for processing information pertaining to the analytical model. A volume mesh may be transformed based on such assumptions before simulation to reduce the computational burden. Such operations are typically referred to as mesh transformations. Thereby, transforming mesh for simulating manufacturing processes and products is still considered as one of the biggest challenges of the technical domain.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for transforming mesh for simulating at least one manufacturing process and at least one product The present application provides a computer implemented method (200) for transforming mesh for simulating at least one manufacturing process and at least one product; said method comprising processor implemented steps of selecting one or more transformation rules (118); executing the selected one or more transformation rules (118) for obtaining a transformation chain (122); and executing the obtained transformation chain (122) for obtaining a transformed mesh data (124) using a transformation engine (114).

The present application provides a mesh transformation system (102) for transforming mesh for simulating at least one manufacturing process and at least one product; said mesh transformation (102) comprising a processor(s) (104); an interface(s) (106); a memory (108) coupled to the processor(s) (108); a module(s) 110, further comprises of a transformation engine (114); and other module (116); a data (112) further comprises of one or more transformation rules (118); a plurality of transformation operators (120); a transformation chain (122); transformed mesh data (124); and other data (126).

BRIEF DESCRIPTION OF THE DRAWINGS

The detailed description is described with reference to the accompanying figures. In the figures, the left-most digit of a reference number identifies the figure in which the reference number first appears. The same numbers are used throughout the drawings to reference like features and components.

Figure 1:
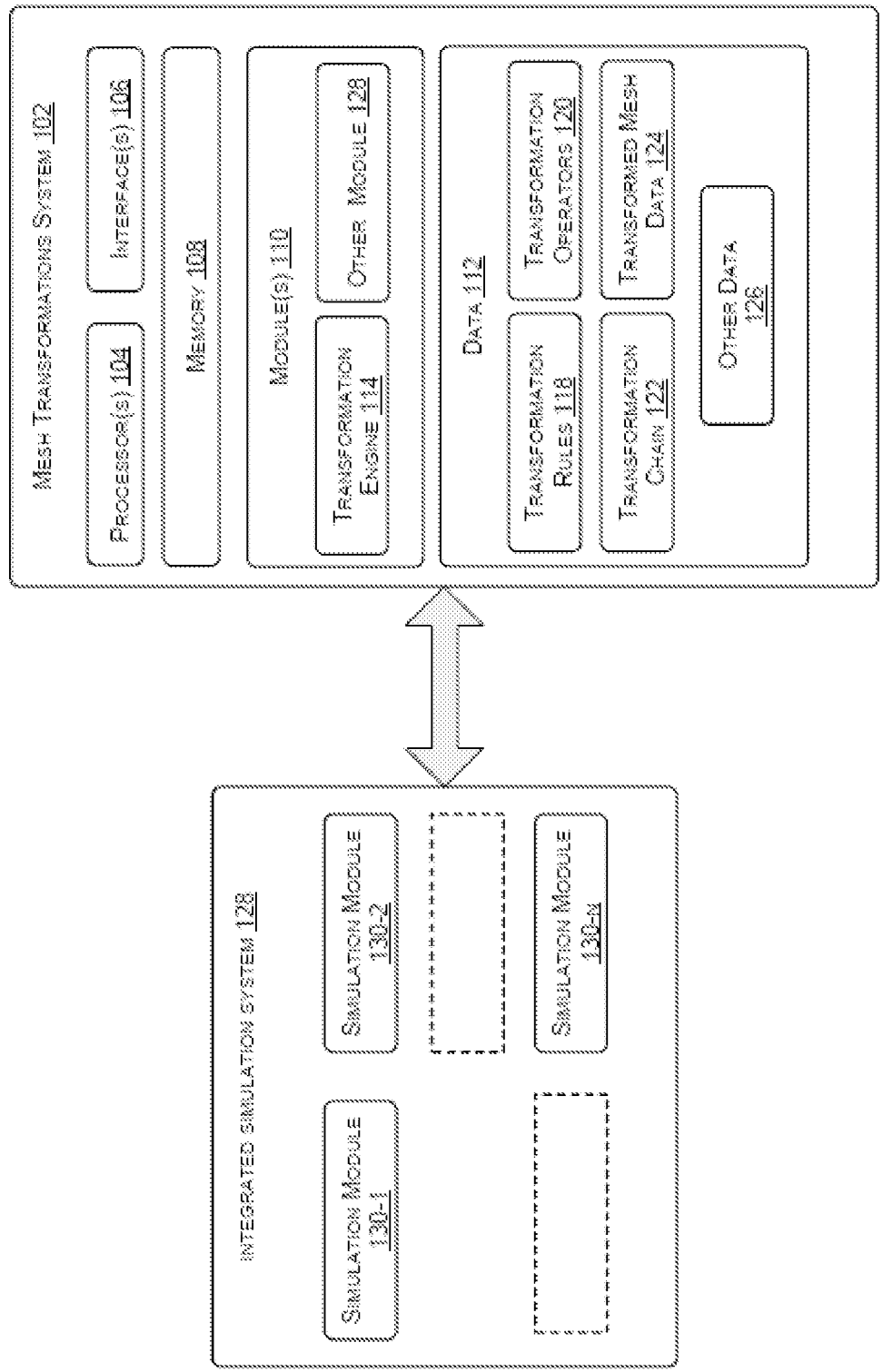
FIG. 1 illustrates a system for mesh transformations for simulation of manufacturing processes and products, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

Method(s) and system(s) for simulating manufacturing, testing and design validation processes for manufacturing an article of manufacture, are described. Methods can be implemented in systems that include, but are not limited to, computing devices, such as, desktop computers, servers, data processing machines, and the like, capable of simulating the environment akin to different stages of a manufacturing process. It should be noted that the product and process referred to in the claims includes an intermediate product and manufacturing process thereof.

As would be understood, any manufacturing process involves subjecting raw material to different stages of a manufacturing process to obtain an article of manufacture. Each of such stages would affect a physical change, and change in state of the material being processed within the different stages. The types of physical and state changes may in turn also be dependent on the design of the article which is to be manufactured, or on other factors, such as choice of material, environment of the manufacturing process, and so on.

It is also desirable that such changes do not affect the structural integrity of the article, either during the manufacturing process or at a late stage when such articles are being used. In order to determine and predict such physical and state changes brought about by the different stages, the entire process may be simulated. Based on simulations of the manufacturing processes, the different physical and state changes may be preempted. The simulations may also provide information as to how the structural integrity of the article would be affected during the manufacturing process, or even after the article has been put into use.

Simulation of such manufacturing processes generally involves obtaining an analytical model representing the article. The analytical model may be subject to various parameters which may intend to replicate the conditions of the manufacturing process. The analytical model in turn may be composed of one or more finite elements, also referred to as volume meshes. The meshes include a plurality of nodes, with each node representing local information of the material or an article which is being manufactured. Examples of such information include, but are not limited to, material composition, material structure, and material properties.

Simulating different stages of a manufacturing process require the use of computing systems. Such systems process the information pertaining to the analytical model and provide an output which is indicative of the effects of manufacturing process on the material used or the article. As would be appreciated by a person skilled in the art, simulations of the different stages of the manufacturing process may be computationally very expensive. In order to implement simulation of such processes efficiently, one or more assumptions may be made for processing information pertaining to the analytical model. The assumptions are made considering certain properties that the article may possess. Examples of such properties include dimensionality and symmetry of the article. Continuing with this example, as part of the simulation the dimensionality of the article may be reduced from 3-dimensions to 2-dimensions. As a result, the requirement of computing resources may be reduced. Similarly, symmetry of the article would allow processing the analytical model pertaining to only part of the geometry as representative of the complete part for a given simulation. Accordingly, the result of the simulation may be extended over the entire article.

In order to simulate an entire manufacturing process, an integrated simulation tool may be used. The integrated simulation tool may further include a plurality of simulation modules. Each of the simulation modules is for simulating the conditions for a specific stage within the manufacturing process. In operation, an integrated simulation involves obtaining an output volume mesh for one stage. The output mesh of one stage is provided as an input to a next simulation module. Prior to being provided to the next or subsequent simulation module, the output mesh may be further processed or transformed. Such operations are typically referred to as mesh transformations.

In conventional simulation systems, such mesh transformations may be configured by human experts. The mesh transformations are typically affected through one or more scripts which have to be created by such experts. As would be understood, specific scripts may be prepared and executed to carry out specific mesh transformations. In cases where the mesh transformations to be implemented are complex, the required scripts may also be complex which in turn may require an inordinate amount of time to prepare.

Furthermore, such mesh transformations may be based on multiple underlying factors such as physics of the underlying phenomenon, symmetry of the component, forces acting on the component, process configuration, and so on. In the absence of such other factors not being considered, the simulation may not be able to provide an accurate depiction of the physical and the state changes.

Systems and methods for mesh transformations for simulation of manufacturing processes and products are described. As mentioned previously, simulation of the different stages of a manufacturing process within an integrated simulation environment involves mesh transformations. As part of such mesh transformations, the output meshes from one simulation module corresponding to one stage of a manufacturing process is processed (i.e., transformed) and provided as input to a subsequent simulation module. In one implementation, the mesh transformations are based on one or more transformation rules. The transformation rules determine the appropriate mesh transformations which are to be applied to a mesh under consideration.

In one implementation, one or more transformation rules are populated. The transformation rules affect the transformation of one or more volume meshes corresponding to the article or product which is to be manufactured. The transformation rules are based on a plurality of current problem context variables. Examples of such context variables include current problem characteristics, such as process, phenomenon, the simulation model being used, components being designed and so on. Depending on the determined current problem context, one or more transformation rules may be obtained. In one implementation, the current problem context may be obtained from a model based on the system which is being simulated.

In another implementation, the transformation rules may further include one or more transformation operators. The transformation operators provide the manner or the mechanism based on which the mesh transformations are carried out. The transformation operators may be obtained from a predefined repository or new operators may be composed based on one or more primitive operators. In one implementation, the transformation operators are automatically selected by the system based on the current problem context. In one implementation, the transformation operators may be selected based on one or more rules or predefined conditions.

Multiple primitive operators may be used in one or more combinations to construct complex transformation operators. These operators may be stored back into the repository for later reuse. In another implementation, the transformation operators may be prescribed for implementing one or more geometric operations such as section, extrusion, rotation, translation, trimming, append, etc. In another implementation the transformation operators may include mesh refinement and coarsening operators. As would be understood by a person skilled in the art, mesh refinement and coarsening operator's increases and decreases, respectively the number of nodes and elements in a mesh region. Depending on whether the number of nodes in the mesh region has increased (i.e., as a result of the refinement) or reduced (i.e., as a result of the coarsening), the transformation process may be more accurate and requiring high computational capability, or may be less accurate and thus would require lower computational capability. The latter may be employed for portions of the mesh regions where high accuracy may not be required.

Once the transformation rules are obtained, they are executed to obtain a transformation chain. The transformation chain may be considered as involving one or more transformation operators arranged in a specific order. In one implementation, the order in which the transformation operators are arranged, is derived based on correctness and efficiency considerations. For example, transformation operations for trimming may not be done before extrusion operations in case of gear tooth cutting, where the gear disk section (output of forging) needs to be extruded first and then tooth is cut using trimming. Similarly, implementing refinement operations after sectioning is more efficient than first refining the whole body and then taking a section. The order in which the one or more transformation operators are arranged may be based on the current problem context.

Once obtained, the transformation chain is further executed on a volume mesh. The volume mesh may be a mesh obtained as an output from a simulation module. As a result of the execution of the transformation chain, the output volume mesh is transformed into an input volume mesh suitable for a subsequent simulation module.

In one implementation, a further determination may be made to ascertain whether the transformation operators included within the transformation chain are supported by a simulation module. The simulation module is configured to receive the result of the execution of the transformation chain as an input for performing simulation based analysis of the article of manufacture. Execution of such operators may as well be delegated to the simulation module.

As would be gathered, the present subject matter allows for an efficient manner of affecting mesh transformations. For example, the transformation chain is automatically generated based on the current context problem to provide a series of transformation operators arranged in a specific order. Relying on the current context problem, the mesh transformations are knowledge driven. Furthermore, the present subject matter also determines which of the transformation operators are natively supported by a simulation module, and ensures such operators are delegated to the simulation module.

The following disclosure describes system and method for simulation of manufacturing processes and products. While aspects of the described system and method can be implemented in any number of different computing systems, environments, and/or configurations, embodiments for mesh transformation system are described in the context of the following exemplary systems and methods.

FIG. 1 illustrates a mesh transformation system (102) for simulation of manufacturing processes and products, in accordance with an embodiment of the present subject matter. In said embodiment, the mesh transformation system (102) performs mesh transformations, which allow the transformation of one or more volume meshes. The transformed volume meshes then may be provided as input to one or more simulation modules.

In one implementation, the mesh transformation system (102) (hereinafter referred to as the system (102)) may be implemented in a networked environment. The networked environment may be a public network environment, including thousands of individual computers, laptops, various servers, such as blade servers, and other computing devices. In another implementation, the network environment can be a private network environment with a limited number of computing devices, such as individual computers, servers, and laptops.

In one implementation, the network may be a wireless network, a wired network, or a combination thereof. The network may also be an individual network or a collection of many such individual networks, interconnected with each other and functioning as a single large network, e.g., the Internet or an intranet. The network may be implemented as one of the different types of networks, such as intranet, local area network (LAN), wide area network (WAN), the internet, and the like. The network may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network may include a variety of network devices, including routers, bridges, servers, computing devices, storage devices, and the like.

The system (102) may be implemented in a variety of computing systems, such as a laptop computer, a desktop computer, a notebook, a workstation, a mainframe computer, a server, a network server, and the like. According to an implementation, the system (102) includes processor(s) (104), interface(s) (106), and a memory (108) coupled to the processor(s) (108). The processor(s) (104) may be implemented as one or more microprocessors, microcomputers, microcontrollers, digital signal processors, central processing units, state machines, logic circuitries, and/or any devices that manipulate signals based on operational instructions. Among other capabilities, the processor(s) (104) may be configured to fetch and execute computer-readable instructions stored in the memory (108).

The memory (108) may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) (106) may include a variety of software and hardware interfaces, for example, interfaces for peripheral device(s), such as a product board, a mouse, an external memory, and a printer. Additionally, the interface(s) (106) may enable the mesh transformation system (102) to communicate with other devices, such as web servers and external repositories. The interface(s) (106) may also facilitate multiple communications within a wide variety of networks and protocol types, including wired networks, for example, LAN, cable, etc., and wireless networks, such as WLAN, cellular, or satellite. For the purpose, the interface(s) (106) may include one or more ports.

The mesh transformation system (102) also includes module(s) (110) and data (112). The module(s) (110) include, for example, a transformation engine (114), and other module(s) (116). The other modules (116) may include programs or coded instructions that supplement applications or functions performed by the mesh transformation system (102). The data (112) may include transformation rules (118), transformation operators (120), transformation chain (122), transformed mesh data (124) and other data (126). The other data (126), amongst other things, may serve as a repository for storing data that is processed, received, or generated as a result of the execution of one or more modules in the module(s) (110).

Although the data (112) is shown internal to the system (102), it will be appreciated by a person skilled in the art that the data (112) can also be implemented external to the system (102), wherein the data (112) may be stored within a database communicatively coupled to the system (102). The system (102) may be further coupled to an integrated simulation system (128). The integrated simulation system (128) may further include a plurality of simulation modules (130-1), (130-2), (130-n) (collectively referred to as simulation modules (130)).

In operation, the transformation engine (114) selects one or more rules from knowledge base. The rules are stored as transformation rules (118). The transformation rules (118) affect the transformation of one or more volume meshes corresponding to the article or product which is to be manufactured. The transformation rules (118) are based on a plurality of current problem context variables. Examples of such context variables include current problem characteristics, such as process, phenomenon, the simulation model being used, component's being designed and so on. In one implementation, the context variables may be stored as other data (126). Depending on the determined current problem context, one or more transformation rules (118) may be obtained. In one implementation, the current problem context may be obtained from a model based on the system which is being simulated. In another implementation, transformation rules (118) are specified by an expert in specific contexts. In operation, the transformation engine (114) generalizes the one or more specific contexts and accordingly adapts the transformation rules (118) accordingly.

In another implementation, the transformation rules (118) may further include one or more operators, such as transformation operators (120). The transformation operators (120) provide the manner or the mechanism based on which the mesh transformations are carried out. The transformation operators (120) may be obtained from a predefined repository or new operators may be composed based on one or more primitive operators. In one implementation, the transformation operators (120) are automatically selected based on the current problem context. In one implementation, the transformation operators may be selected based on one or more rules or predefined conditions.

Multiple primitive operators may be used in one or more combinations to construct complex transformation operators (120). These operators may be stored back into a repository, such as a database (not shown in FIG. 1) for later reuse. In another implementation, the transformation operators (120) may be prescribed for implementing one or more geometric operations such as section, extrusion, rotation, translation, trimming, append, etc. In another implementation the transformation operators (120) may include mesh refinement and coarsening operators. As explained previously, mesh refinement and coarsening operators increases and decreases, respectively the number of nodes and elements in a mesh region. Depending on whether the number of nodes in the mesh region has increased (i.e., as a result of the refinement) or reduced (i.e., as a result of the coarsening), the transformation process may be more accurate and requiring high computational capability, or may be less accurate and thus would require lower computational capability.

Once the transformation rules (118) are obtained, they are executed by the transformation engine (114) to obtain a transformation chain (122). The transformation chain (122) may be considered as involving one or more transformation operators (120) arranged in a specific order. The order in which the transformation operators (120) are arranged is to simulate the various stages of the manufacturing process. The order in which the one or more transformation operators (120) are arranged may be based on the current problem context. In one implementation, the order in which the transformation operators are arranged, is derived based on correctness and efficiency considerations. For example, transformation operations for trimming may not be done before extrusion operations in case of gear tooth cutting, where the gear disk section (output of forging) needs to be extruded first and then tooth is cut using trimming. Similarly, implementing refinement operations after sectioning is more efficient than first refining the whole body and then taking a section.

Once obtained, the transformation chain (122) is further executed by the transformation engine (114) on a volume mesh. The volume mesh may be a mesh obtained as an output from a simulation module, such as simulation module (130-1). As a result of the execution of the transformation chain, an output volume mesh in the form of transformed mesh data (124), is obtained. The transformed mesh data (124) may form an input volume mesh suitable for a subsequent simulation module, such as the simulation module (130-2).

In one implementation, a further determination may be made to ascertain whether the transformation operators (120) included within the transformation chain (122) are supported by any one or more simulation modules (130). For example, the simulation module (130-2) is configured to receive the result of the execution of the transformation chain (122) as an input for performing simulation based analysis of the article of manufacture. The mesh volume upon which the transformation chain (122) was executed may in turn be obtained as an output of the simulation module (130-1). In another implementation, execution of operators may be delegated to any one or more of the simulation modules (130).

As would be gathered, the present subject matter allows for an efficient manner of affecting mesh transformations. For example, the transformation chain (122) is automatically generated based on the current context problem to provide a series of transformation operators (120) arranged in a specific order. Relying on the current context problem, the mesh transformations are knowledge driven. Furthermore, the present subject matter also determines which of the transformation operators are natively supported by a simulation module, say simulation module (130-1), and ensures such operators are delegated to the simulation module (130-1).

Figure 2:
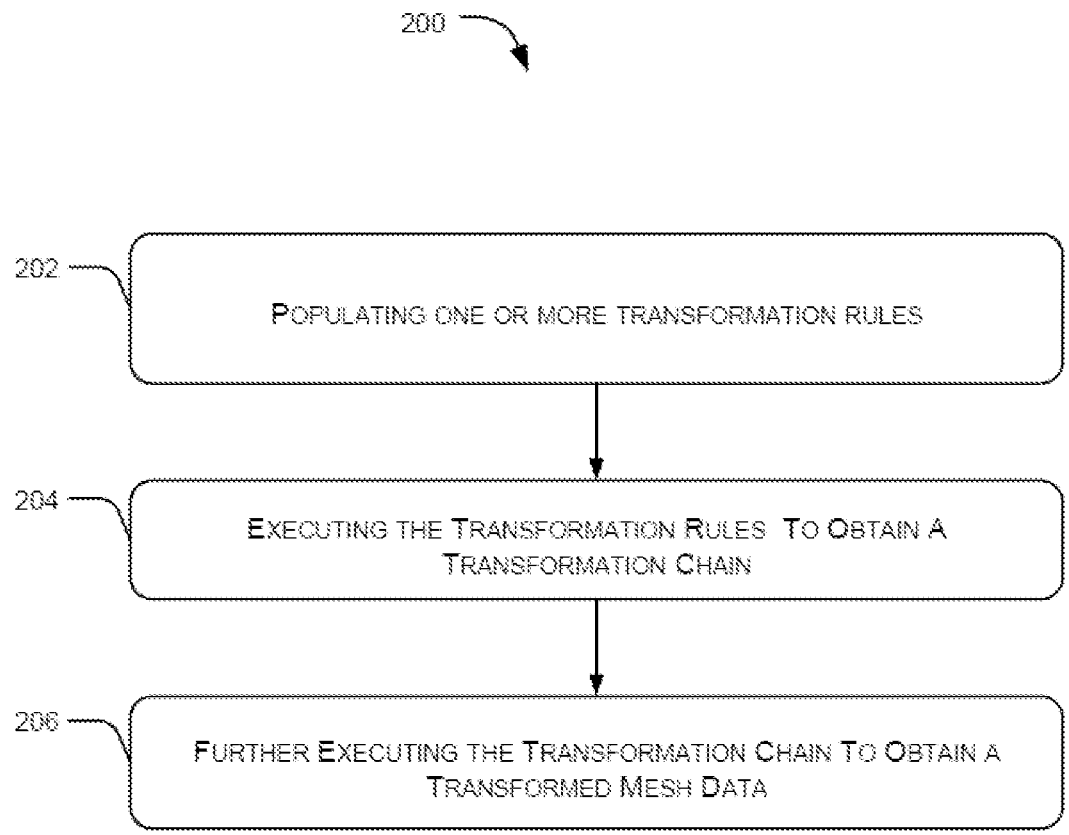
FIG. 2 illustrates a method for implementing mesh transformations for simulation of manufacturing processes and products, in accordance with an implementation of the present subject matter.

FIG. 2 illustrates a method (200) for implementing mesh transformation for simulation of manufacturing processes and products, according to an embodiment of the present subject matter. The method (200) is implemented in a computing device, such as mesh transformation system (102). The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof.

At block 202, one or more transformation rules are selected. For example, the transformation engine (114) selects one or more transformation rules (118). The transformation engine (114) selects the transformation rules (118) based on a plurality of current problem context variables. In another implementation, the transformation rules (118) may further include one or more operators such as transformation operators (120). The transformation operators (120) provide the manner or the mechanism based on which the mesh transformations are carried out. The transformation operators (120) may be obtained from a predefined repository or new operators may be composed based on one or more primitive operators. In one implementation, the transformation operators (120) are automatically selected based on the current problem context. In one implementation, the transformation operators may be selected based on one or more rules or predefined conditions.

At block 204, the transformation rules are executed to obtain a transformation chain. For example, once the transformation rules (118) are obtained, they are executed by the transformation engine (114) to obtain a transformation chain (122). The transformation chain (122) may be considered as involving one or more transformation operators (120) arranged in a specific order. The order in which the transformation operators (120) are arranged is to simulate the various stages of the manufacturing process. The order in which the one or more transformation operators (120) are arranged may be based on the current problem context. In one implementation, the order in which the transformation operators are arranged, is derived based on correctness and efficiency considerations.

At block 206, the transformation chain is executed to obtain a transformed output mesh. For example, once obtained, the transformation chain (122) is further executed by the transformation engine (114) on a volume mesh. The volume mesh may be a mesh obtained as an output from a simulation module, such as simulation module (130-1). As a result of the execution of the transformation chain, an output volume mesh in the form of transformed mesh data (124), is obtained. The transformed mesh data (124) may form an input volume mesh suitable for a subsequent simulation module, such as the simulation module (130-2).

Although embodiments for methods and systems for mesh transformations for simulating manufacturing processes and products have been described in a language specific to structural features and/or methods, it is to be understood that the invention is not necessarily limited to the specific features or methods described. Rather, the specific features and methods are disclosed as exemplary embodiments of the present subject matter.

We claim:

1. A method for transforming mesh for simulating at least one manufacturing process and at least one product; said method comprising processor implemented steps of:
   selecting one or more transformation rules, wherein the one or more transformation rules comprises one or more transformation operators for providing a mechanism for carrying out the mesh transformations, and wherein the transformation operators further includes mesh refinement and coarsening operators;
   executing the selected one or more transformation rules for obtaining a transformation chain; and
   executing the obtained transformation chain for obtaining a transformed mesh data using a transformation engine.

2. The method as claimed in claim 1, wherein the one or more transformation rules are selected based on a plurality of current problem context variables selected from a group consisting of a process, a phenomenon, a simulation model being used, and a component being designed.

3. The method as claimed in claim 1, wherein the one or more transformation operators is obtained from a predefined repository or new operators is composed based on one or more primitive operators.

4. The method as claimed in claim 1, wherein the one or more transformation operators is selected based on current problem context, one or more rules or predefined conditions.

5. The method as claimed in claim 1, wherein the one or more transformation operators further includes geometric transformation operators including section, extrusion, translation, trimming, and append.

6. The method as claimed in claim 1, wherein the mesh refinement and coarsening operators increases and decreases, respectively the number of nodes and elements in the mesh region.

7. The method as claimed in claim 1, wherein the transformation chain further comprises of the one or more transformation operators arranged in an order based on the current problem context or on correctness and efficiency considerations for simulating a plurality of manufacturing process stages.

8. The method as claimed in claim 1, further comprises of determining which of the transformation operators are natively supported by a plurality of simulation modules, and such operators are delegated to the plurality of simulation modules.

9. The method as claimed in claim 1, wherein the transformation chain is further executed by the transformation engine on a volume mesh.

10. The method as claimed in claim 9, wherein the volume mesh is a mesh obtained as an output of a simulation module out of the plurality of simulation modules.

11. The method as claimed in claim 9, wherein the volume mesh is obtained in the form of the transformed mesh data.

12. The method as claimed in claim 11, wherein the transformed mesh data is used as an input volume mesh for a subsequent simulation module (130-2) out of the plurality of simulation modules.

13. A mesh transformation system for transforming mesh for simulating at least one manufacturing process and at least one product; said mesh transformation system comprising:
   at least one or more processor(s);
   at least one or more interface(s);
   a memory coupled to the processor(s);
   at least one or more module(s), further comprises of a transformation engine; and
   other module;
   a data further comprises of one or more transformation rules;
   a plurality of transformation operators for providing a mechanism for carrying out the mesh transformation, wherein the plurality of transformation operators are comprised in the one or more transformation rules, wherein the transformation operators further includes mesh refinement and coarsening operators;
a transformation chain; transformed mesh data; and other data;
wherein the transformation engine is used for:
  selecting the one or more transformation rules;
  executing the selected one or more transformation rules for obtaining the transformation chain; and
executing the obtained transformation chain for obtaining the transformed mesh data.

14. The mesh transformation system as claimed in claim 13, further coupled to an integrated simulation system comprising a plurality of simulation modules, wherein a simulation module out of a plurality of simulation modules is adapted for outputting a volume mesh in the form of the transformed mesh data which is further used as an input volume mesh for a subsequent simulation module out of the plurality of simulation modules.

15. The mesh transformation system as claimed in claim 13, wherein the other data is adapted to store processed, received, and generated data as a result of the execution of one or more modules in the module(s).

\* \* \* \* \*